(12) United States Patent
Park et al.

(10) Patent No.: US 9,680,954 B2
(45) Date of Patent: Jun. 13, 2017

(54) SYSTEM AND METHOD FOR PROVIDING VIRTUAL DESKTOP SERVICE USING CACHE SERVER

(71) Applicant: ELECTRONICS AND TELECOMMUNICATIONS RESEARCH INSTITUTE, Daejeon (KR)

(72) Inventors: Jeong-Sook Park, Daejeon (KR); Soo-Young Kim, Cheongju-si (KR); Chei-Yol Kim, Daejeon (KR); Young-Chang Kim, Daejeon (KR); Sang-Min Lee, Daejeon (KR); Hong-Yeon Kim, Daejeon (KR); Young-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 368 days.

(21) Appl. No.: 14/193,736

(22) Filed: Feb. 28, 2014

(65) Prior Publication Data
US 2014/0317223 A1 Oct. 23, 2014

(30) Foreign Application Priority Data
Apr. 19, 2013 (KR) .......................... 10-2013-0043346

(51) Int. Cl.
H04L 29/08 (2006.01)

(52) U.S. Cl.
CPC ...... *H04L 67/2842* (2013.01); *H04L 67/1097* (2013.01); *H04L 67/2847* (2013.01)

(58) Field of Classification Search
CPC ............................ H04L 67/2842; H04L 29/08
USPC .......................................................... 709/213
See application file for complete search history.

(56) References Cited

U.S. PATENT DOCUMENTS

| 8,046,551 | B1 | 10/2011 | Sahin |
| 8,099,554 | B1 | 1/2012 | Solomon et al. |
| 8,661,360 | B2 | 2/2014 | Jeong et al. |
| 8,954,487 | B2 | 2/2015 | Jung et al. |

(Continued)

FOREIGN PATENT DOCUMENTS

| KR | 10-2010-0138689 | 12/2010 |
| KR | 10-2011-0056843 | 5/2011 |
| WO | WO 2011/122138 A1 | 10/2011 |

OTHER PUBLICATIONS

Korean Notice of Allowance dated Mar. 29, 2017 in corresponding Korean Patent Application No. 10-2013-0043346.

*Primary Examiner* — David Lazaro
*Assistant Examiner* — Zia Khurshid
(74) *Attorney, Agent, or Firm* — Staas & Halsey LLP

(57) ABSTRACT

There are provided a system and method for providing a virtual desktop service using a cache server. A system for providing a virtual desktop service according to the invention includes a host server configured to provide a virtual desktop service to a client terminal using a virtual machine, a distributed file system configured to store data for the virtual machine, and a cache server that is provided for each host server group having at least one host server, and performs a read process or a write process of data using physically separate caches when the read process or write process of the data is requested from the virtual machine in the host server.

18 Claims, 7 Drawing Sheets

(56) References Cited

U.S. PATENT DOCUMENTS

| | | | |
|---|---|---|---|
| 2011/0153853 A1* | 6/2011 | London | G06F 9/4445 709/229 |
| 2012/0304171 A1* | 11/2012 | Joshi | G06F 9/45558 718/1 |
| 2014/0052892 A1* | 2/2014 | Klein | G06F 12/0246 711/103 |
| 2014/0297780 A1* | 10/2014 | Zhou | H04L 67/2847 709/216 |

* cited by examiner

SYSTEM AND METHOD FOR PROVIDING VIRTUAL DESKTOP SERVICE USING CACHE SERVER

CROSS-REFERENCE TO RELATED APPLICATION

This application claims priority to and the benefit of Korean Patent Application No. 10-2013-0043346, filed on Apr. 19, 2013, the disclosure of which is incorporated herein by reference in its entirety.

BACKGROUND

1. Field of the Invention

Example embodiments of the invention relate to a virtual desktop infrastructure (VDI) system, and more specifically, to a system and method for providing a virtual desktop service using a cache server in which each host server group having at least one host server includes a cache server, and the cache server uses physically separate caches to perform a read process and a write process, performs data prefetch or preread on a read cache on which a read process is performed when an overload occurs, and moves data in a write cache to a distributed file system so as not to degrade performance of the write cache according to an available space of the write cache on which a write process is performed.

2. Discussion of Related Art

In a VDI system for supporting a virtual desktop service, a storage connected to a central server backend systematically stores and manages an OS and applications used by users, and data generated by the users, and the users access the system remotely and perform necessary tasks as if it were their own desktop environment.

This VDI system may correspond to security such as information leakage prevention and intensive resource management. On the other hand, the VDI system has a problem in that response performance of the system affecting the user needs to be supported as in a personal PC. In particular, operations such as a simultaneous virus scan and a boot and login storm that is generated when most of the VDI system users start their tasks may cause a load of about 10 times that of a normal state. It is necessary to design the system so as to guarantee system response in such a case.

As expected, input and output operations with the storage are frequently required in the VDI system, which is the biggest cause of bottlenecks.

A structure of a general VDI system includes client terminals that are shown as a screen to a user, host servers having many VMs installed and operated therein, and a file system in which data for all VMs is stored. In order to accommodate an increase in data usage for the user and an increase of the number of virtual desktop users, the file system needs to support high scalability as an important characteristic. A storage area network (SAN) storage that is currently commonly used is very expensive and has limitations in terms of storage scalability.

The cost limitation may be overcome when network attached storage (NAS) is used. The NAS has many advantages but has relatively low response performance, and thus devices for overcoming the low response performance are necessary.

As described above and can be seen in many analysis results of a VDI workload characteristic, a VDI I/O workload is mostly caused by a small-sized random write, and is known to be about 80%. When a certain degree of bandwidth is supported in an environment having this characteristic, it is possible to achieve a satisfactory level of experienced performance of the entire VDI system by introducing a structure for improving write response performance.

Currently, in order to address these problems, a multi-level cache structure using a memory, an SSD, or the like has been proposed. In addition, a method for improving performance through providing a cache in the host server has been proposed. These methods may improve general-purpose cache performance but may not be optimal methods in which the VDI characteristic is reflected.

SUMMARY OF THE INVENTION

In view of the above-described problems, the example embodiments of the present invention provide a system and method for providing a virtual desktop service using a cache server in which each host server group having at least one host server includes a cache server, and the cache server uses physically separate caches to perform a read process and a write process.

The example embodiments of the present invention also provide a system and method for providing a virtual desktop service using a cache server in which the cache server performs a read process and a write process using physically separate caches and performs data prefetch or preread on a read cache on which a read process is performed when an overload occurs.

The example embodiments of the present invention also provide a system and method for providing a virtual desktop service using a cache server in which the cache server performs a read process and a write process using physically separate caches and moves data in a write cache to a distributed file system so as not to degrade performance of the write cache according to an available space of the write cache on which a write process is performed.

The invention is not limited to the aforementioned descriptions and other purposes that are not mentioned above may be clearly understood by those skilled in the art from the following descriptions.

According to an aspect of the invention, there is provided a system for providing a virtual desktop service. The system includes a host server configured to provide a virtual desktop service to a client terminal using a virtual machine, a distributed file system configured to store data for the virtual machine, and a cache server that is provided for each host server group having at least one host server, and performs a read process and a write process of data using physically separate caches when the read process or write process of the data is requested from the virtual machine in the host server.

The cache server may perform the write process of the requested data using a memory cache and perform the read process of the requested data using a solid state disk (SSD) cache.

When it is determined that data prefetch is necessary according to a pattern or a time point in which a pre-generated overload occurs, the cache server may read predetermined data from the distributed file system in advance and store the read data in the SSD cache.

After a state of the memory cache is checked, when it is checked that memory usage is equal to or greater than a predetermined upper threshold, the cache server may consecutively write the data in the distributed file system until the memory usage is less than a predetermined lower threshold.

After a state of the memory cache is checked, when it is checked that memory usage is equal to or greater than a predetermined lower threshold and is less than a predetermined upper threshold, the cache server may perform writing according to data of a predetermined size in the distributed file system at a predetermined cycle.

When a read request for specific data is received from the virtual machine, the cache server may read the data from at least one of the memory cache, the SSD cache, and the distributed file system, store the read data in a pre-allocated memory space in the SSD cache, return the stored data to the virtual machine, and then release the pre-allocated memory space.

When a write request for specific data is received from the virtual machine, the cache server may check whether there is an available space in the memory cache, and when there is no available space, the cache server may move the oldest stored data in the size of the write-requested data from the memory cache to the distributed file system to secure a memory space, copy the write-requested data in the secured memory space, and align the data in order of a data position in a corresponding file for each user.

According to another aspect of the invention, there is provided a system for providing a virtual desktop service. The system includes a cache mediating unit configured to perform a read process and a write process of data using physically separate caches when the read process or write process of the data is requested from a virtual machine in a host server included in its own host server group for providing a virtual desktop service, a memory cache management unit configured to store the data for which the write process is requested in a memory cache, and an SSD cache management unit configured to store the data for which the read process is requested in a solid state disk (SSD) cache.

When it is determined that data prefetch is necessary according to a pattern or a time point in which a pre-generated overload occurs, the cache mediating unit may read predetermined data from a distributed file system in advance and store the read data in the SSD cache.

After a state of the memory cache is checked, when it is checked that memory usage is equal to or greater than a predetermined upper threshold, the cache mediating unit may consecutively write the data in the distributed file system until the memory usage is less than a predetermined lower threshold.

After a state of the memory cache is checked, when it is checked that memory usage is equal to or greater than a predetermined lower threshold and is less than a predetermined upper threshold, the cache mediating unit may perform writing according to data of a predetermined size in the distributed file system at a predetermined cycle.

According to still another aspect of the invention, there is provided a method of providing a virtual desktop service. The method includes receiving a request for a read process or a write process of data from a virtual machine in a host server included in its own host server group for providing a virtual desktop service, performing the read process or write process of the data using one of physically separate caches when the read process or write process of the data is requested, and returning a performing result of the read process or write process of the data.

In the performing, the write process of the requested data may be performed using a memory cache and the read process of the requested data may be performed using a solid state disk (SSD) cache.

In the performing, when it is determined that data prefetch is necessary according to a pattern or a time point in which a pre-generated overload occurs, predetermined data may be read from the distributed file system in advance, and the read data may be stored in the SSD cache.

In the performing, after a state of the memory cache is checked, when it is checked that memory usage is equal to or greater than a predetermined upper threshold, the data may be consecutively written in the distributed file system until the memory usage is less than a predetermined lower threshold.

In the performing, after a state of the memory cache is checked, when it is checked that memory usage is equal to or greater than a predetermined lower threshold and is less than a predetermined upper threshold, writing may be performed according to data of a predetermined size in the distributed file system at a predetermined cycle.

In the performing, when a read request for specific data is received from the virtual machine, the data may be read from at least one of the memory cache, the SSD cache, and the distributed file system, the read data may be stored in a pre-allocated memory space in the SSD cache, the stored data may be returned to the virtual machine, and then the pre-allocated memory space may be released.

In the performing, when a write request for specific data is received from the virtual machine, it is checked whether there is an available space in the memory cache, and when there is no available space, the oldest stored data in the size of the write-requested data may be moved from the memory cache to the distributed file system to secure a memory space, the write-requested data may be copied in the secured memory space, and the data may be aligned in order of a data position in a corresponding file for each user.

BRIEF DESCRIPTION OF DRAWINGS

The above and other objects, features and advantages of the present invention will become more apparent to those of ordinary skill in the art by describing in detail exemplary embodiments thereof with reference to the accompanying drawings, in which.

DESCRIPTION OF EXAMPLE EMBODIMENTS

Figure 1:
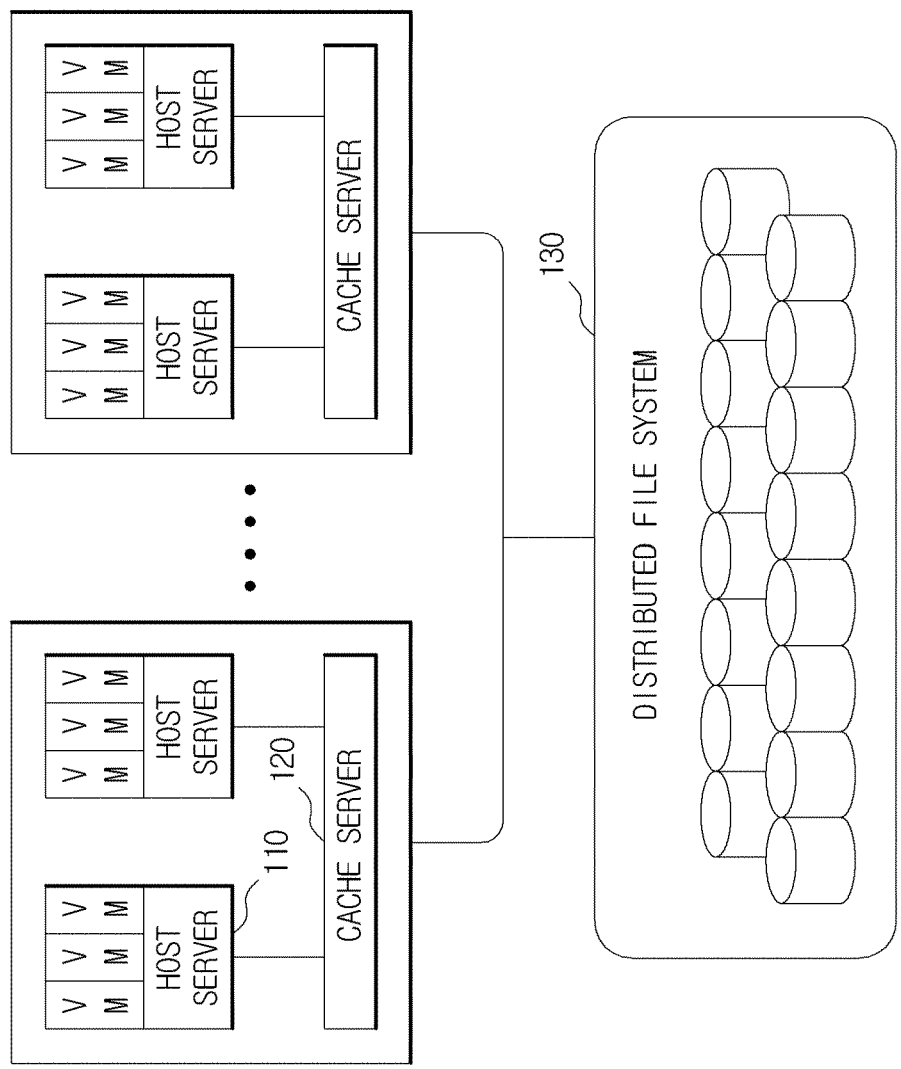
FIG. 1 is a diagram illustrating a system for providing a virtual desktop service according to an embodiment of the invention.

Hereinafter, a system and method for providing a virtual desktop service using a cache server according to an embodiment of the invention will be described with reference to FIGS. 1 to 7. Detailed descriptions will be made focusing on parts that are necessary to understand operations and effects according to the invention.

In descriptions of components of the invention, a different reference numeral may be assigned to the same component depending on the drawings, and the same reference numeral may be assigned to the same component in different drawings. However, neither of these means either that the component has a different function depending on embodiments or that the component has the same function in different embodiments. Functions of each component may be determined based on descriptions of each component in the embodiment.

In particular, the invention proposes a new method in which each host server group having at least one host server includes a cache server, the cache server uses physically separate caches to perform a read process and a write process, performs data prefetch or preread on a memory on which a read process is performed when an overload occurs, and moves data in a write cache to a distributed file system so as not to degrade performance of the write cache according to an available space of the write cache on which a write process is performed.

FIG. 1 is a diagram illustrating a system for providing a virtual desktop service according to an embodiment of the invention.

As illustrated in FIG. 1, the system for providing a virtual desktop service according to the invention may include a host server 110, a cache server 120, and a distributed file system 130.

The host server 110 may provide a virtual desktop service to a plurality of client terminals using a virtual machine. The host server 110 may include a hypervisor for supporting operations of a plurality of virtual machines. Here, the hypervisor refers to software that is designed to control access methods of various operating systems (OSs) to various computer resources such as a processor or a memory.

The host server 110 may request data read or write from the cache server according to a request from a client terminal provided with a virtual desktop service using the virtual machine.

The distributed file system 130 is a storage system for storing data used for operating the virtual machine and data generated from the virtual machine, and may be, for example, an NAS based storage system.

Instead of an SAN based storage system, the NAS based storage system is used in the invention. This is because the NAS based storage system has a cheaper cost and greater scalability than the SAN based storage system. In particular, when there are many users to be supported and an amount of data generated by each user rapidly increases, scalability of the storage system serves as an important factor.

On the other hand, the NAS based storage system has a problem in that a processing rate is relatively low. This problem may be overcome using the cache server.

The cache server 120 may serve as a cache between the host server and the distributed file system. That is, when a request for a read or write process of data is received from the virtual machine in the host server, the cache server 120 may use one of physically separate caches to perform a read or write process of data, perform data prefetch on a read cache on which a read process is performed when an overload occurs, and move data of a predetermined size to the distributed file system according to an available space of the write cache on which a write process is performed.

The read cache, which is used as a cache for performing a read process, may include an SSD, and the write cache, which is used as a cache for performing a write process, may include a RAM.

That is, in order to provide an optimal form of a virtual desktop service, in the invention, a memory, which is the fastest storage device, is operated as a write-back type write cache, and the SSD is operated as a read cache for guaranteeing read data performance even in an I/O storm condition or the like.

In this case, the cache server may be connected to a predetermined number of host servers. For example, a single cache server may be connected to each server rack.

According to the invention, it is possible to provide storage scalability by virtue of cooperation between the cache server and the distributed file system, to provide satisfactory performance to the user without performance degradation due to an increase of the number of system users, and to build at a low cost.

Figure 2:
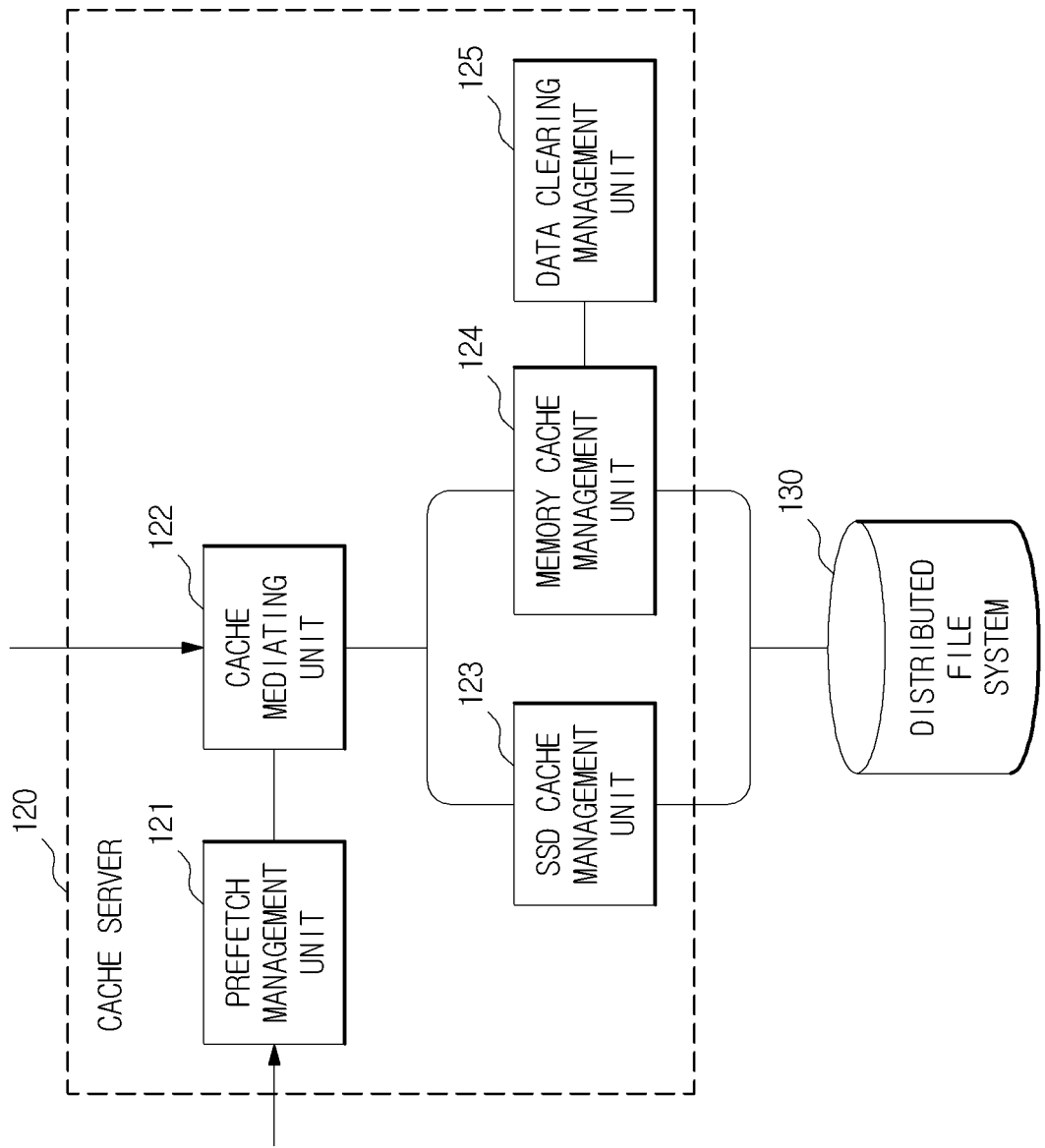
FIG. 2 is a diagram illustrating a detailed configuration of a cache server according to the embodiment of the invention.

FIG. 2 is a diagram illustrating a detailed configuration of the cache server according to the embodiment of the invention.

As illustrated in FIG. 2, the cache server 120 according to the invention may include a cache mediating unit 121, a memory cache management unit 122, an SSD cache management unit 123, a prefetch management unit 124, and data clearing management unit 125. In the cache server having this configuration, the entire workload is mostly caused by a small-sized random write and a read operation is sequential. Accordingly, the memory is used as a write buffer and the SSD is used as a read buffer in order to increase a response time of the system.

The cache mediating unit 121 may process a data read request or a data write request from/to the virtual machine in the host server. When the write request is received, the cache mediating unit 121 writes data in the memory in a write-back manner through a memory cache manager. When the read request is received, the cache mediating unit 121 may combine data temporarily stored in the memory and data temporarily stored in the SSD, and return the combined data to the virtual machine.

The memory cache management unit 122 may store and manage data in a memory cache used as the write buffer. In addition, the memory cache management unit 122 may classify a plurality of pieces of data that are simultaneously received from the plurality of virtual machines according to virtual machine or user.

In this case, the memory cache management unit 122 may include the memory cache serving as the write buffer.

The SSD cache management unit 123 may store and manage data for which a read process has been requested once in an SSD cache. In addition, the SSD cache management unit 123 may read and store necessary data from the distributed file system in advance, to prevent performance degradation due to a storm phenomenon that can occur when a plurality of users boot or log in at the same time.

In this case, the SSD cache management unit 123 may include the SSD cache serving as the read buffer.

In order to cope with the storm phenomenon, the prefetch management unit 124 may determine a pattern or a time point capable of causing a storm, and request necessary data to be stored in the SSD cache in advance based on a determination result.

In this case, the prefetch management unit 124 monitors a workload of the host server for a specific period, and obtains a pattern and a time point in which an overload occurs based on a monitoring result.

The data clearing management unit 125 monitors a state of the memory cache. When memory cache usage is determined to be greater than a predetermined threshold based on a monitoring result, the data clearing management unit 125 may request that data of a predetermined size out of pre-stored data be moved to the distributed file system. In this way, it is possible to secure an available memory space in the memory cache in advance.

Figure 3:
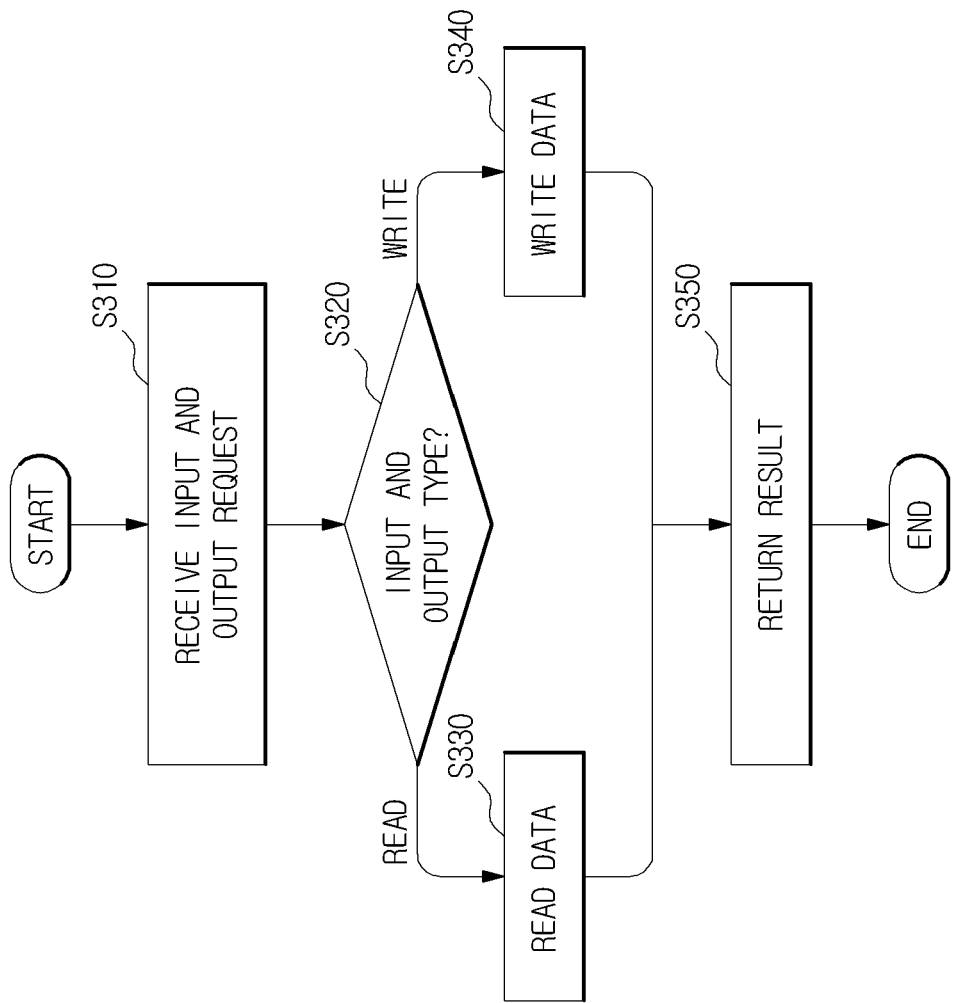
FIG. 3 is a flowchart illustrating operations of the cache server according to the embodiment of the invention.

FIG. 3 is a flowchart illustrating operations of the cache server according to the embodiment of the invention.

As illustrated in FIG. 3, the cache server 130 according to the invention may check whether there is a read request or a write request for specific data from the virtual machine (S310).

Next, when there is the read request, the cache server may read pre-stored data (S330). That is, the cache server reads the pre-stored data and returns the data to the virtual machine as a result of the read request (S350).

In this case, the data may be distributed and stored in the memory cache, the SSD cache, and the distributed file system.

For example, when reading of 200 bytes of data is requested, and 50 bytes of data is stored in the memory cache, 130 bytes of data is stored in the SSD cache, and 20 bytes of data is stored in the distributed file system, the cache server reads and combines the data from each cache.

Next, when there is the write request, the cache server may store input data (S340). That is, the cache server stores data in the memory cache and returns a storing result to the virtual machine (S350).

Figure 4:
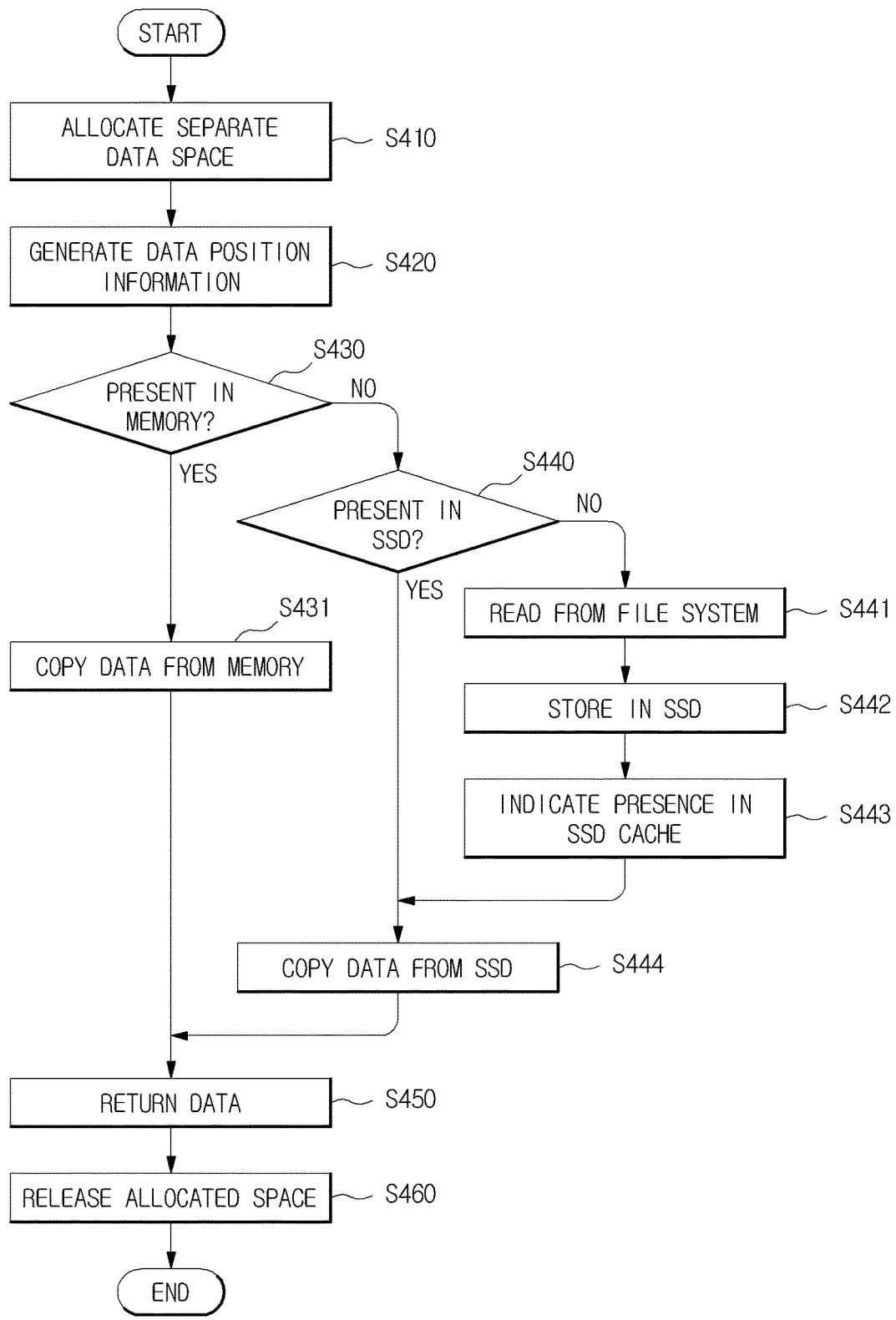
FIG. 4 is a flowchart illustrating a method of processing a read request from the cache server according to the embodiment of the invention.

FIG. 4 is a flowchart illustrating a method of processing the read request from the cache server according to the embodiment of the invention.

As illustrated in FIG. 4, when the read request for specific data is received from the virtual machine, the cache server according to the invention may allocate a space corresponding to a data size to be read in the SSD cache (S410).

Next, the cache server checks a position in which data to be read is stored, that is, the memory cache, the SSD cache, and the distributed file system. Based on a checked result, data position information may be generated (S420).

Next, the cache server checks whether there is data in the memory cache based on the position information (S430). When it is checked that there is data in the memory cache, the cache server copies the data from the memory cache and stores the data in a pre-allocated space (S431).

On the other hand, when there is no data in the memory cache, the cache server checks whether there is data in the SSD cache (S440). When it is checked that there is data in the SSD cache, the cache server copies the data from the SSD cache and stores the data in a pre-allocated space (S444).

On the other hand, when there is no data in the SSD cache, the cache server reads data from the distributed file system (S441) and may store the read data in the SSD cache (S442).

In addition, in order to perform quick search, the cache server may display a value for indicating presence of data in the SSD cache on a predetermined type of bitmap, for example, "0" to indicate presence and "1" to indicate absence (S443).

Next, the cache server may copy data from the SSD and store the data in a pre-allocated space (S444).

Next, when the entire pre-allocated space is filled with data, the cache server may return the filled data to the virtual machine (S450) and release the pre-allocated space in the SSD cache (S460).

Figure 5:
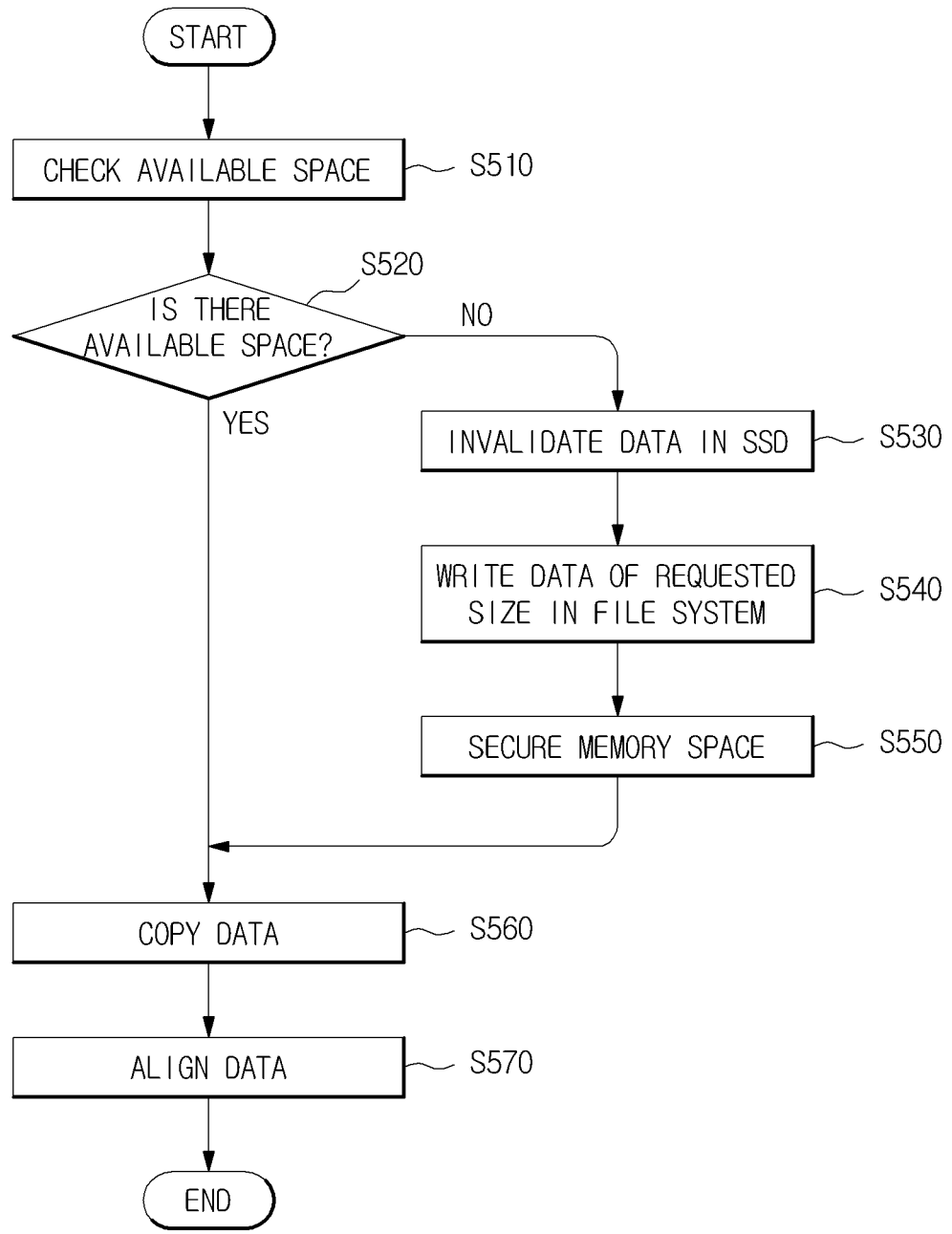
FIG. 5 is a flowchart illustrating a method of processing a write request from the cache server according to the embodiment of the invention.

FIG. 5 is a flowchart illustrating a method of processing the write request from the cache server according to the embodiment of the invention.

As illustrated in FIG. 5, when the write request for specific data is received from the virtual machine, the cache server according to the invention may check whether there is an available space in the memory cache.

Next, when it is checked that there is an available space, the cache server may copy data in the available space in the memory cache and align the data in order of a data position in a corresponding file for each user in order to sequence the data.

For example, since data of a predetermined size is received from the virtual machines used by the plurality of users, the cache server aligns the received data in order of a data position in a corresponding file for each user.

On the other hand, when it is checked that there is no available space, the cache server may invalidate or delete the same data in the SSD cache for data integrity.

The cache server moves the oldest stored data in the amount of the write-requested data from the memory cache into the distributed file system, and thus a space may be secured.

Next, when the space is secured in the memory cache, the cache server may copy the write-requested data in the secured space and align the data in order of a data position in a corresponding file for each user in order to serialize the data.

Figure 6:
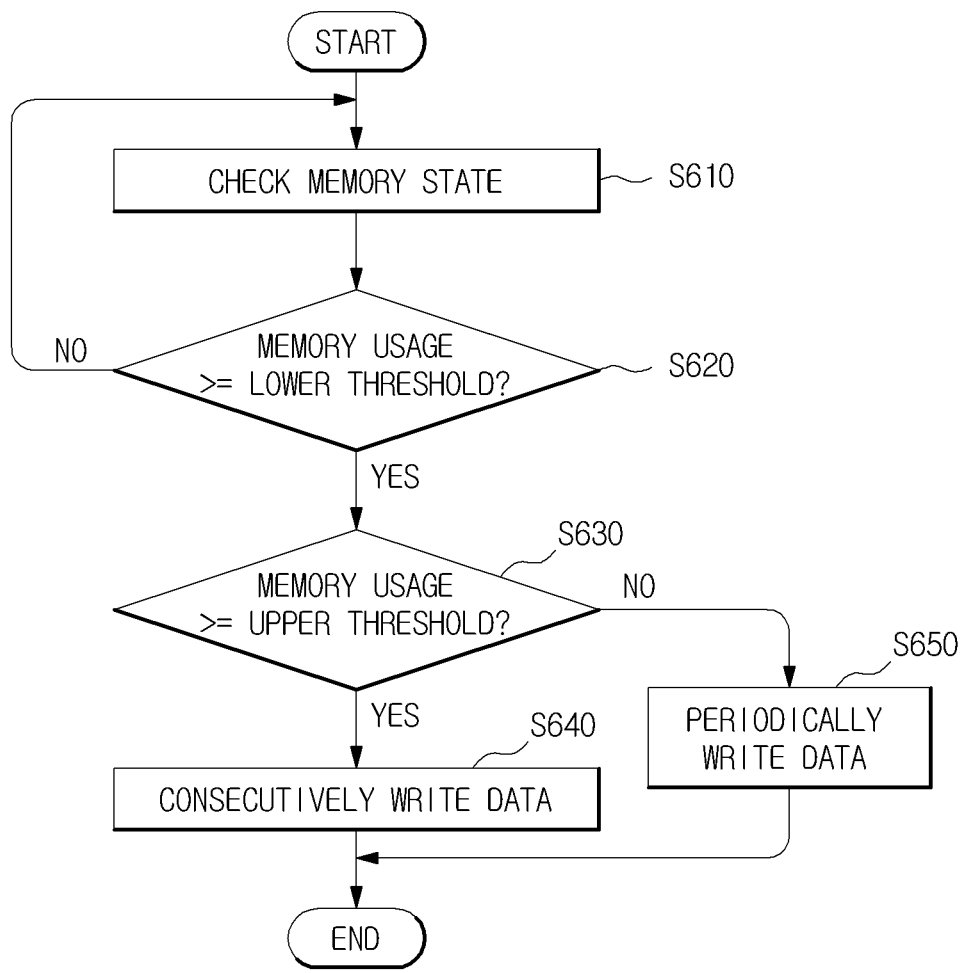
FIG. 6 is a flowchart illustrating a data clearing method of the cache server according to the embodiment of the invention.

FIG. 6 is a flowchart illustrating a data clearing method of the cache server according to the embodiment of the invention.

As illustrated in FIG. 6, the cache server according to the invention checks a state of the memory cache periodically or aperiodically (S610), and may determine whether memory usage or a memory storage space is equal to or greater than a predetermined lower threshold based on a checked result (S620).

Next, when it is determined that the memory usage is equal to or greater than the predetermined lower threshold, the cache server may determine whether the memory usage is equal to or greater than the predetermined upper threshold (S630).

On the other hand, when it is determined that the memory usage is equal to or less than the predetermined lower threshold, the cache server may determine that a sufficient memory space is secured and check the state of the memory cache again.

Next, when it is determined that the memory usage is equal to or greater than the predetermined upper threshold, the cache server consecutively writes data in the distributed file system until the memory usage is less than a lower threshold (S640) and may secure a data space corresponding to the size of the moved data.

That is, when the memory usage is less than the predetermined lower threshold, the cache server determines that a sufficient memory space is secured and does not write data in the distributed file system.

In this case, until the memory usage is less than the predetermined lower threshold, the cache server continuously writes entire data in the distributed file system and moves the data. For example, when there are 200 bytes of entire data and 150 bytes of data that is equal to or greater than the lower threshold, 150 bytes of data is written in the distributed file system.

On the other hand, when it is determined that the memory usage is not equal to or greater than the predetermined upper threshold, the cache server periodically performs writing according to the data of the predetermined size in the distributed file system (S650) and may secure a data space corresponding to the size of the moved data.

In this case, the cache server performs writing according to the data of the predetermined size in the distributed file system at a predetermined cycle to the extent that performance of the write cache is not degraded.

This data clearing refers to a process of writing data stored in the memory in the distributed file system and securing a memory space. In order to reduce a data access time as much as possible, data is stored in the memory unless an amount of memory becomes insufficient.

Figure 7:
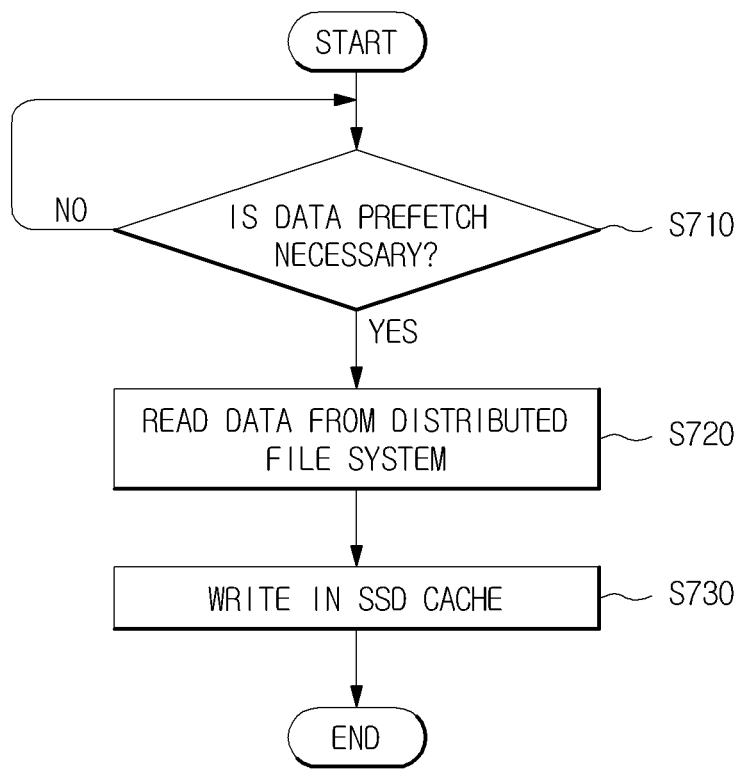
FIG. 7 is a flowchart illustrating a data prefetching method of the cache server according to the embodiment of the invention.

FIG. 7 is a flowchart illustrating a data prefetching method of the cache server according to the embodiment of the invention.

As illustrated in FIG. 7, the cache server according to the invention checks a pattern or a time point capable of causing a storm and may determine that data prefetch is necessary based on a checked result (S710).

In this case, a workload is monitored for a predetermined period, a pattern or a time point in which an overload occurs is previously analyzed based on a monitoring result, and analyzed information is used as the pattern or the time point capable of causing a storm.

Next, when it is determined that data prefetch is necessary, the cache server reads corresponding data from the distributed file system (S720) and may store the read data in the SSD cache (S730).

In this way, the invention may provide a sequential characteristic of data writing and minimize access to the distributed file system. Therefore, it is possible to increase system performance.

While the above-described embodiments of the invention describe that all components are combined into one unit or are operated in a combined manner, the invention is not limited thereto. That is, within the scope of the invention, at least one of the components may be selectively combined and operated. Although all of the components may each be implemented as single independent hardware, some or all components may be selectively combined and implemented as a computer program having a program module that performs some or all functions combined in a single hardware device or a plurality of hardware devices. Such a computer program is stored in computer readable media such as a USB memory, a CD, or a flash memory, is read and executed by a computer, and thus may implement the embodiment of the invention. Examples of computer program recording media may include magnetic recording media, optical recording media, and carrier wave media.

According to the invention, the cache server is provided between the host server and the distributed file system, and the cache server uses physically separate caches and performs a read process and a write process. Therefore, it is possible to operate the system with minimum latency and improve system response performance.

According to the invention, the cache server is provided between the host server and the distributed file system, the cache server performs a read process and a write process using physically separate caches, performs data prefetch on a memory on which a read process is performed when an overload occurs, and moves data of a predetermined size to the distributed file system according to an available space of a memory on which a write process is performed. As a result, it is possible to maximize effectiveness of storage space usage.

In addition, according to the invention, since the NAS is used as the distributed file system that is connected to the cache server, it is possible to reduce building costs of the distributed file system.

Furthermore, according to the invention, since the NAS is used as the distributed file system that is connected to the cache server, it is possible to support scalability of the distributed file system.

The above-described embodiments are only examples and it will be understood by those skilled in the art that various modifications and alternations may be made without departing from the spirit and scope of the invention. Therefore, the embodiments disclosed in this specification should be considered in a descriptive sense only and not for purposes of limitation. Accordingly, the scope of the invention is not limited by the embodiments. The scope of the invention is defined by the appended claims and encompasses all modifications and equivalents that fall within the scope of the appended claims.

REFERENCE NUMERALS

110: host server
120: cache server
121: cache mediating unit
122: memory cache management unit
123: SSD cache management unit
124: prefetch management unit
125: data clearing management unit
130: distributed file system

What is claimed is:

1. A system for providing a virtual desktop service, comprising:
a plurality of host servers, at least one host server from among the plurality of host servers configured to provide the virtual desktop service to a client terminal using a virtual machine;
a distributed file system configured to store data for the virtual machine; and
a cache server coupled to a group of host servers from among the plurality of host servers, and the distributed file system, to serve as a cache for the data between the group of host servers and the distributed file system,
the cache server coupled to:
a first hardware data cache, and
a second hardware data cache physically separate from the first hardware data cache and having a faster write process speed than a write process speed of the first hardware data cache,
the cache server performs a read process of the data using the first hardware data cache when the read process of the data is requested from the virtual machine in the group of host server, or a write process of the data using the second hardware data cache having the faster write process speed when the write process of data is requested from the virtual machine in the group of host servers.

2. The system according to claim 1, wherein:
the first hardware data cache is a solid state disk (SSD) cache and the second hardware data cache is a memory cache, and
a write process speed of the memory cache is faster than a write process speed of the SSD cache.

3. The system according to claim 2, wherein, when determined that data prefetch is necessary according to a pattern or a time point in which a pre-generated overload occurs, the cache server reads the data from the distributed file system in advance and stores the read data in the SSD cache.

4. The system according to claim 2, wherein, after a state of the memory cache is checked, when checked that memory usage is equal to or greater than an upper threshold, the cache server consecutively writes the data in the distributed file system until the memory usage is less than a lower threshold.

5. The system according to claim 2, wherein, after a state of the memory cache is checked, when checked that memory usage is equal to or greater than a lower threshold and is less than an upper threshold, the cache server performs writing according to a size of the data in the distributed file system at a cycle.

6. The system according to claim 2, wherein, when a read request for the data is received from the virtual machine, the cache server reads the data from at least one of the memory cache, the SSD cache, and the distributed file system, stores the read data in an allocated memory space in the SSD cache, returns the stored data to the virtual machine, and then releases the pre-allocated memory space.

7. The system according to claim 2, wherein, when a write request for the data is received from the virtual machine, the cache server checks whether there is an available space in the memory cache, and when there is no available space, the cache server moves oldest stored data in size of the write-requested data from the memory cache to the distributed file system to secure a memory space, copies the write-requested data in the secured memory space, and aligns the write-requested data in order of a data position in a corresponding file for a user.

8. A system to implement a cache server for a group of host servers for providing a virtual desktop service, comprising
at least one memory; and
at least one computing hardware configured, including configured by a computer program stored in the at least one memory, to cause the following to be performed:
when a read process of the data is requested from a virtual machine in the group of host servers for providing the virtual desktop service, performing the read process of data using a first hardware data cache provided for the group of host servers;
when a write process of data is requested from the virtual machine in the group of host servers for providing the virtual desktop service, performing the write process of the data using a second hardware data cache provided for the group of host servers, the second hardware data cache physically separated from the first cache and having a faster write process speed than a write process speed of the first hardware data cache;
storing the data for the requested write process in the second hardware data cache; and
storing the data for the requested read process in the first hardware data cache, wherein:
the first hardware data cache is a solid state disk (SSD) cache and the second hardware data cache is a memory cache,
a write process speed of the memory cache is faster than a write process speed of the SSD cache.

9. The system according to claim 8, wherein the at least one computing hardware configured, including configured by the computer program, to further cause the following to be performed:
when determined that data prefetch is necessary according to a pattern or a time point in which a pre-generated overload occurs, reading the data from a distributed file system in advance and stores the read data in the SSD cache.

10. The system according to claim 8, wherein the at least one computing hardware configured, including configured by the computer program, to further cause the following to be performed:
after a state of the memory cache is checked, when checked that memory usage is equal to or greater than an upper threshold, writing the data in a distributed file system until the memory usage is less than a lower threshold.

11. The system according to claim 8, wherein the at least one computing hardware configured, including configured by the computer program, to further cause the following to be performed:
after a state of the memory cache is checked, when checked that memory usage is equal to or greater than a lower threshold and is less than an upper threshold, performing writing according to a size of the data in the distributed file system at a cycle.

12. A method of providing a virtual desktop service, comprising:
by a cache server coupled to a group of host servers from among a plurality of host servers, and a distributed file system, to serve as a cache for data between the group of host servers and the distributed file system, the cache server coupled to a first hardware data cache, and a second hardware data cache physically separate from the first hardware data cache and having a faster write process speed than a write process speed of the first hardware data cache, to perform:
receiving a request for a read process of the data or a write process of the data from a virtual machine in the group of host servers for providing the virtual desktop service;
when the read process is requested from the virtual machine, performing the read process of the data using the first hardware data cache provided for the group of host servers;
when the write process is requested from the virtual machine, performing the write process of the data using the second hardware data cache provided for the group of host servers, the second hardware data cache physically separated from the first data cache and having the faster write process speed than the write process speed of the first hardware data cache; and
returning a performing result of the requested read process or the requested write process.

13. The method according to claim 12, wherein:
the first hardware data cache is a solid state disk (SSD) cache and the second hardware data cache is a memory cache, and
a write process speed of the memory cache is faster than a write process speed of the SSD cache.

14. The method according to claim 13, wherein, in the performing of the requested read process of the data, when determined that data prefetch is necessary according to a pattern or a time point in which a pre-generated overload occurs, the data is read from the distributed file system in advance, and the read data is stored in the SSD cache.

15. The method according to claim 13, wherein, in the performing of the requested write process of the data, after a state of the memory cache is checked, when checked that memory usage is equal to or greater than an upper threshold, the data is consecutively written in the distributed file system until the memory usage is less than a lower threshold.

16. The method according to claim 13, wherein, in the performing of the requested write process of the data, after a state of the memory cache is checked, when checked that memory usage is equal to or greater than a lower threshold and is less than an upper threshold, writing is performed according to a size of the data in the distributed file system at a cycle.

17. The method according to claim 13, wherein, in the performing of the read process of the data, when a read request for the data is received from the virtual machine, the data is read from at least one of the memory cache, the SSD cache, and the distributed file system, the read data is stored in a pre-allocated memory space in the SSD cache, the stored data is returned to the virtual machine, and then the pre-allocated memory space is released.

18. The method according to claim 13, wherein, in the performing of the write process of the data, when a write request for the data is received from the virtual machine, checked whether there is an available space in the memory cache, and when there is no available space, the oldest stored data in the size of the write-requested data is moved from the memory cache to the distributed file system to secure a memory space, the write-requested data is copied in the secured memory space, and the write-requested data is aligned in order of a data position in a corresponding file for each user.

* * * * *